(12) United States Patent
Dawson et al.

(10) Patent No.: US 8,696,283 B1
(45) Date of Patent: Apr. 15, 2014

(54) WEIGHT SCREW

(71) Applicant: Callaway Golf Company, Carlsbad, CA (US)

(72) Inventors: Patrick Dawson, San Diego, CA (US); Robert Cruz, Chula Vista, CA (US); Thomas J. DiMarco, Carlsbad, CA (US); Daniel C. Fox, Oceanside, CA (US); James E. Stevens, Oceanside, CA (US); Alan C. Bettencourt, Solana Beach, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 13/754,373

(22) Filed: Jan. 30, 2013

Related U.S. Application Data (60) Provisional application No. 61/705,498, filed on Sep. 25, 2012.

(51) Int. Cl.
*F16B 35/00* (2006.01)

(52) U.S. Cl.
USPC .......................................... 411/393; 411/383

(58) Field of Classification Search
CPC ...... F16B 35/005; F16B 35/044; F16B 35/06; F16B 33/006; F16B 33/004; F16B 15/0092
USPC ........... 411/383, 393, 407, 900, 907; 473/312
See application file for complete search history.

(56) References Cited

U.S. PATENT DOCUMENTS

| | | | |
|---|---|---|---|
| 5,540,435 A * | 7/1996 | Kawasaki | 473/309 |
| 6,773,360 B2 | 8/2004 | Willett et al. | |
| 7,166,040 B2 | 1/2007 | Hoffman et al. | |
| 7,186,190 B1 | 3/2007 | Beach et al. | |
| 7,223,180 B2 * | 5/2007 | Willett et al. | 473/334 |
| 7,273,423 B2 | 9/2007 | Imamoto | |
| 7,407,447 B2 | 8/2008 | Beach et al. | |
| 7,410,425 B2 * | 8/2008 | Willett et al. | 473/334 |
| 7,410,426 B2 * | 8/2008 | Willett et al. | 473/334 |
| 7,572,194 B2 | 8/2009 | Yamamoto | |
| 7,588,502 B2 | 9/2009 | Nishino | |
| 7,632,194 B2 | 12/2009 | Beach et al. | |
| 7,744,484 B1 | 6/2010 | Chao | |
| 7,771,290 B2 * | 8/2010 | Bezilla et al. | 473/335 |
| 7,846,041 B2 | 12/2010 | Beach et al. | |
| 8,177,661 B2 | 5/2012 | Beach et al. | |
| 2006/0122004 A1 * | 6/2006 | Chen et al. | 473/335 |
| 2008/0039229 A1 * | 2/2008 | Lo | 473/335 |
| 2013/0029775 A1 | 1/2013 | Demkowski et al. | |

* cited by examiner

*Primary Examiner* — Roberta Delisle (74) *Attorney, Agent, or Firm* — Rebecca Hanovice; Michael A. Catania; Sonia Lari (57) ABSTRACT

A screw comprising a drive part, a threaded part, and a retaining ring is disclosed herein. Each of the drive part and the threaded part comprises a plurality of interface surfaces that transmit torque from the drive part to the threaded part and prevent the parts from disengaging from one another during use. Each plurality of interface surfaces forms one or more geometric shapes that create additional friction between the drive and threaded parts, and may further include mating pins and holes to prevent the parts from detaching from one another. The retaining ring, which removably connects the screw to a wrench during assembly of the screw with a receptacle, is disposed within a cavity formed when the drive part is assembled with the threaded part.

20 Claims, 11 Drawing Sheets

WEIGHT SCREW

CROSS REFERENCES TO RELATED APPLICATIONS

The present application claims priority to U.S. Provisional Patent Application No. 61/705,498 filed Sep. 25, 2012, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

1. Field of the Invention

The present invention relates to a multi-piece weight screw with a retaining feature and a unidirectional torque transferring feature.

2. Description of the Related Art

In recent years, golf consumers have become more interested in customizing their golf equipment. As such, many manufacturers have begun incorporating adjustable features into their golf clubs. One such feature is weighting, which can be adjusted through the use of removable or movable weights, including weight screws, affixed to various regions of a golf club head or shaft. While there are several different kinds of golf club weight screws currently available on the market, many of these screws have structural weaknesses that can lead to breakage and thus require consumers to spend additional money replacing them. Furthermore, once a weight is removed there is die potential for the consumer to lose it, which is inconvenient for the golfer. As such, there is a need for a weight screw with an improved structure that prevents breakage and loss.

BRIEF SUMMARY OF THE INVENTION

One aspect of the present invention is a two piece weight screw that may be used to adjust the weight of a golf club head. The two part screw of the present invention separates the first, drive part, which may be Torx™, hex, Phillips, etc., from the second, threaded part. This screw further includes a mechanism for removably attaching the screw to an adjustment wrench, which may be a retaining ring that engages a specific geometry of the wrench. The retaining ring is disposed on the second part of the screw assembly, and preferably sits within a cavity in the second part where it cannot move in a vertical direction and has space to expand horizontally around its diameter. This cavity becomes an enclosed space when the first part of the screw assembly is assembled with the second part of the screw assembly.

Another aspect of the present invention is a torque transfer method. An interface surface is provided between the first and second parts of the screw assembly, and the interface of the present invention transfers the torque applied at the drive side in the first part of the screw to the threads of the second part of the screw without slipping.

Yet another aspect of the present invention is a screw comprising a drive part comprising a receiving cavity, a threaded part comprising a projecting portion and a pocket, and a retaining ring, wherein the drive part is formed separately from the threaded part, wherein the retaining ring is disposed in the pocket, and wherein the projecting portion is sized to mate with the receiving cavity. In some embodiments, the retaining ring is composed of a material selected from the group consisting of elastomeric material, metal material, and composite material, and in a further embodiment may be composed of steel. In other embodiments, the receiving cavity comprises a shape, which may be selected from the group consisting of circular, triangular, square, rectangular, oval, and hexalobular. In some embodiments, the receiving cavity may comprise a plurality of pins, the projecting portion may comprise a plurality of holes, and the plurality of pins may mate with the plurality of holes. In an alternative embodiment, the receiving cavity may comprise the plurality of holes and the projecting portion may comprise the plurality of pins.

In one embodiment, the pocket may have a first diameter, the retaining ring may have a second diameter, and the second diameter may be smaller than the first diameter. In another embodiment, the pocket may be sized to permit the retaining ring to expand in a horizontal direction and not a vertical direction. In some embodiments, the drive part may comprise a through bore, which may have hexalobular geometry. In some embodiments, torque applied to the drive part may be transmitted to the threaded part via the receiving cavity and the projecting portion. In another embodiment, the drive part may be composed of a first material, the threaded part may be composed of a second material, and the first material may be different from the second material. In some embodiments, the drive part may be composed of a material having a density of no less than 1 g/cc to and no more than 16 g/cc, and in other embodiments, the threaded part may be composed of a material having a density of no less than 2.5 g/cc and no more than 12 g/cc. In still other embodiments, the drive part may be composed of thixomolded magnesium material, and the threaded part may be composed of a different metal material.

Another aspect of the present invention is a weight screw comprising a drive part composed of a material having a density of no less than 1 g/cc to and no more than 16 g/cc, a threaded part formed separately from the threaded part composed of a material having a density of no less than 2.5 g/cc and no more than 12 g/cc, a receiving cavity, a projecting portion, a pocket, and a retaining ring composed of a metal alloy, wherein the retaining ring is disposed in the pocket, wherein the pocket is sized to permit the retaining ring to expand in a horizontal direction and not a vertical direction, and wherein the projecting portion is sized to mate with the receiving cavity. In some embodiments, the receiving cavity may be disposed on the drive part, the projecting portion and the pocket may be disposed on the threaded part, and the receiving cavity may have a hexalobular shape. Another embodiment may further comprise a plurality of holes and a plurality of pins that mate with the plurality of holes. In a further embodiment, the plurality of holes may be disposed on the receiving cavity and the plurality of pins may be disposed on the projecting portion.

Another aspect of the present invention is a set of weight screws or a kit comprising one or more of the weight screws described herein.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The weight screws of the present invention are designed to help a golfer achieve discrete weighting goals in golf club heads without sacrificing structural integrity, but do not have to be limited to use with golf clubs, or even sporting equipment, as they can be used with any structure or device that requires or could benefit from adjustable weight technology. The weight screws of the present invention are also designed to be retained on a wrench during adjustment and thus be less susceptible to loss. The weight screws of the present invention may include one or more features of the weight screws disclosed in U.S. patent application Ser. No. 13/410,127, filed on Mar. 1, 2012, the disclosure of which is hereby incorporated by reference in its entirety herein. The weight screws of the present invention may also include any of the features of the embodiments disclosed in U.S. patent application Ser. No. 13/412,395, filed on Mar. 5, 2012, the disclosure of which is hereby incorporated by reference in its entirety herein. In particular, the weight screws of the present invention may include the interrupted thread pattern disclosed in that application.

As shown in the Figures, each screw 10 of the present invention has a first, drive part 20 and a second, threaded part 30, which combine to create an internal pocket or cavity 40 that houses the retaining ring 50 and prevents it from moving in a vertical direction inside the screw 10 while allowing it to expand horizontally. A (preferred embodiment of the present invention is shown in FIGS. 1A through 4B. As shown in these Figures, the drive part 20 has a hexalobular throughbore 21 and a receiving cavity 22 with a plurality of interface surfaces 25. The threaded part 30 has a threaded region 31 and a head 34 having a projecting portion 32, which also comprises a plurality of interface surfaces 35. In order to assemble the screw 10, the projecting portion 32 mates with the receiving cavity 22 to connect the drive part 20 and the threaded part 30 together, and friction between the interface surfaces 25, 35 prevents these two parts 20, 30 from disengaging from one another during use. The interface surfaces 25 of the drive part 20 also bear against the interface surfaces 35 of the threaded part 30, and transmit torque from the drive part 20 to the threaded part 30 when the screw is being threaded into a receptacle, (such as one of the weight ports shown in U.S. patent application Ser. No. 13/629,391, the disclosure of which is hereby incorporated by reference in its entirety herein) using a wrench or other tool.

Figure 1A:
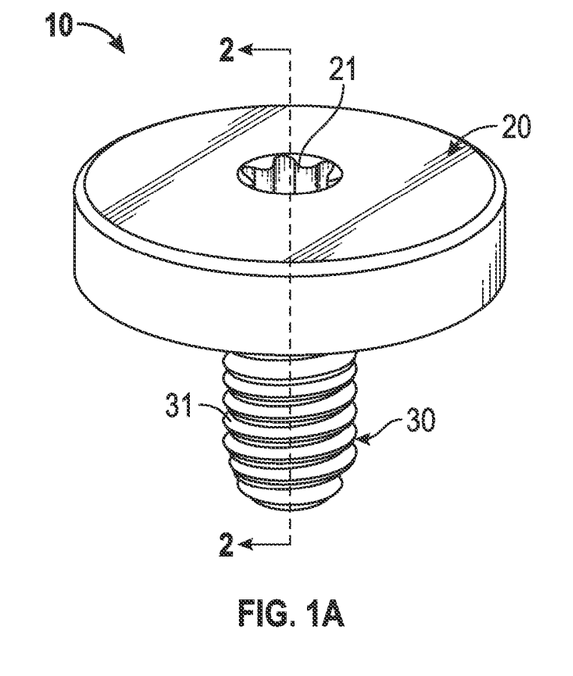
FIG. 1A is a side perspective view of a first embodiment of the present invention.
Figure 1B:
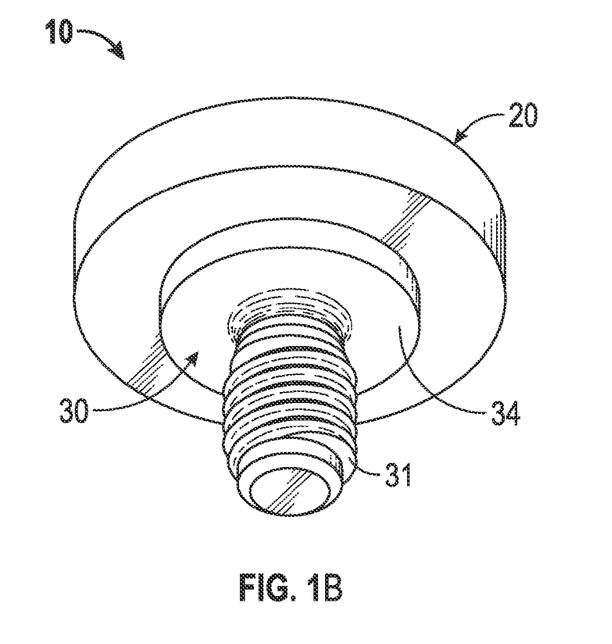
FIG. 1B is a bottom perspective view of the embodiment shown in FIG. 1A.
Figure 2:
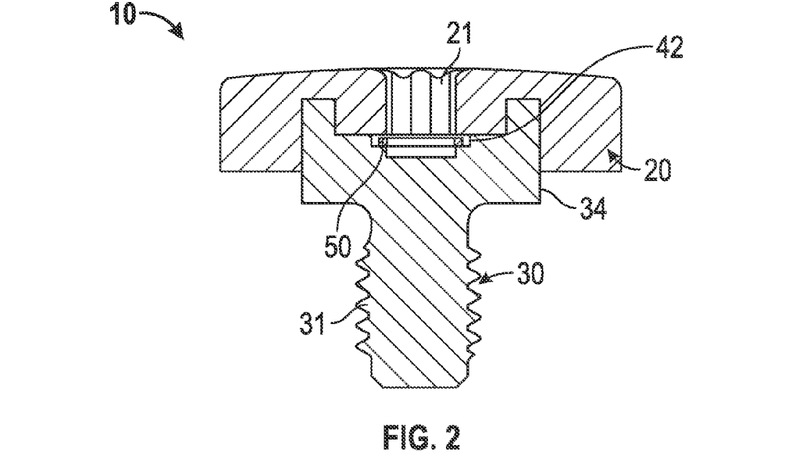
FIG. 2 is a cross-sectional view of the embodiment shown in FIG. 1A along lines 2-2.
Figure 3A:
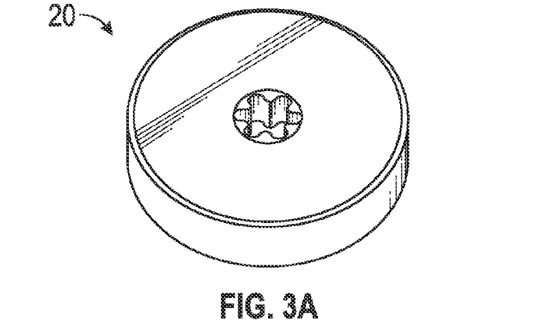
FIG. 3A is a top perspective view of the drive part of the first embodiment.
Figure 3B:
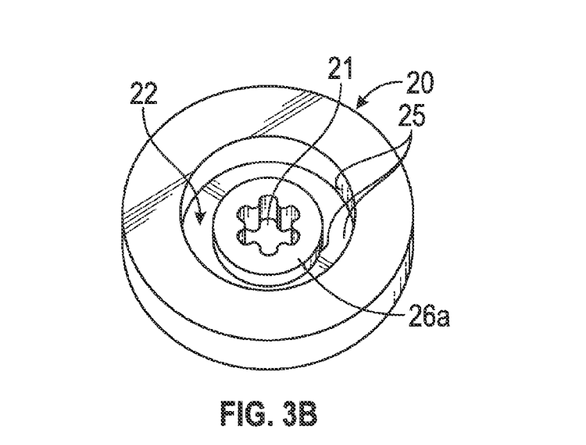
FIG. 3B is a bottom perspective view of the drive part of the first embodiment.
Figure 4A:
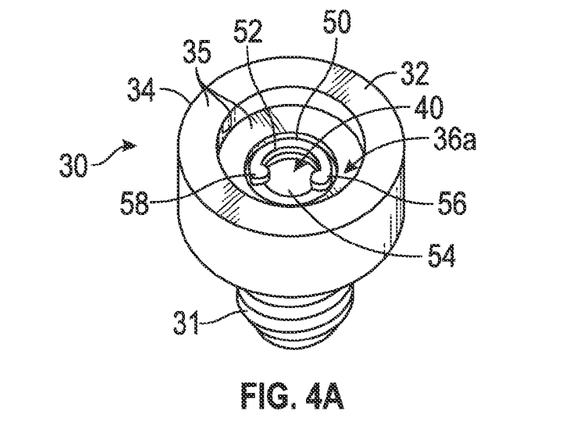
FIG. 4A is a top perspective view of the threaded part of the first embodiment with a retaining ring.
Figure 4B:
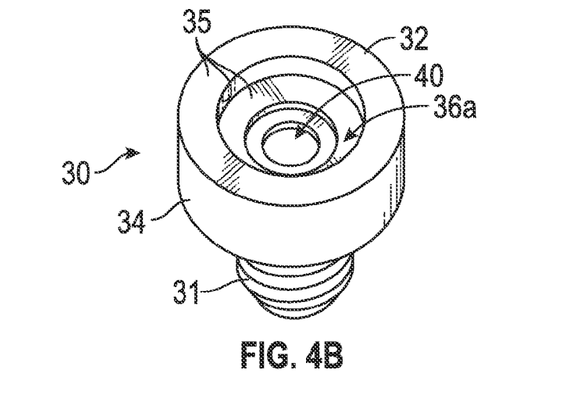
FIG. 4B is a top perspective view of the threaded part of the first embodiment without a retaining ring.
Figure 5:
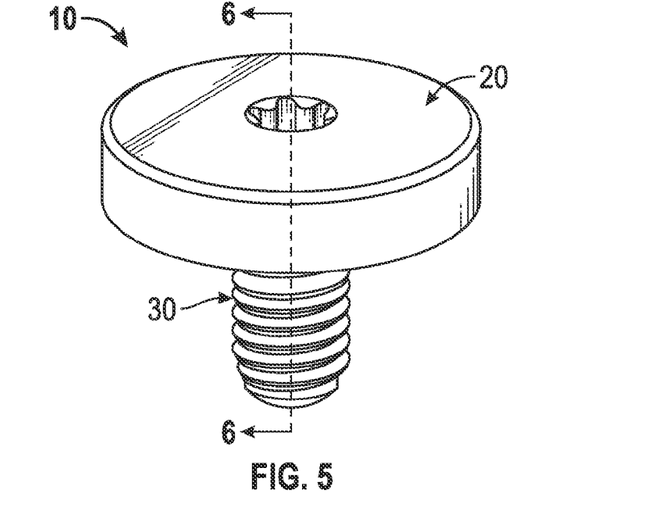
FIG. 5 is a side perspective view of a second embodiment of the present invention.
Figure 6:
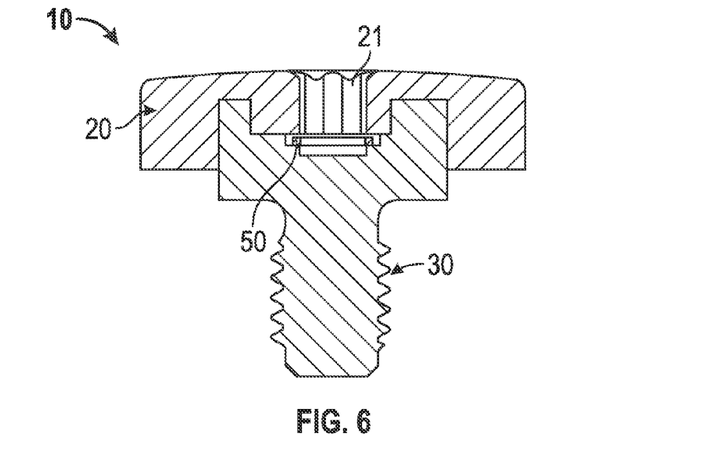
FIG. 6 is a cross-sectional view of the embodiment shown in FIG. 5 along tines 6-6.
Figure 7:
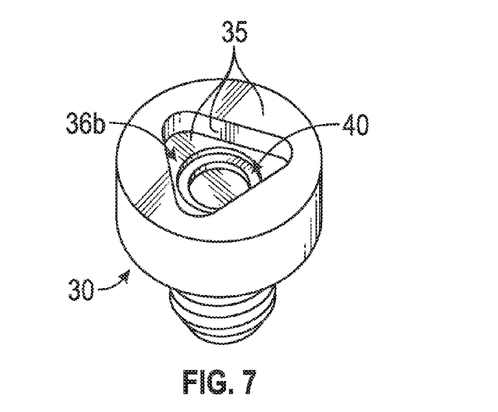
FIG. 7 is a top perspective view of the threaded part of the second embodiment without a retaining ring.
Figure 8:
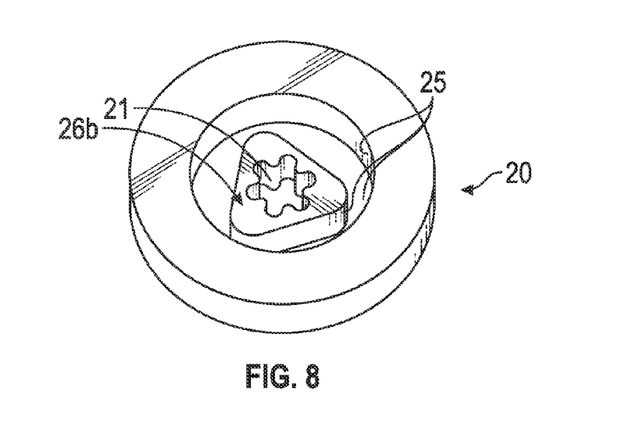
FIG. 8 is a bottom perspective view of the drive part of the second embodiment.
Figure 9:
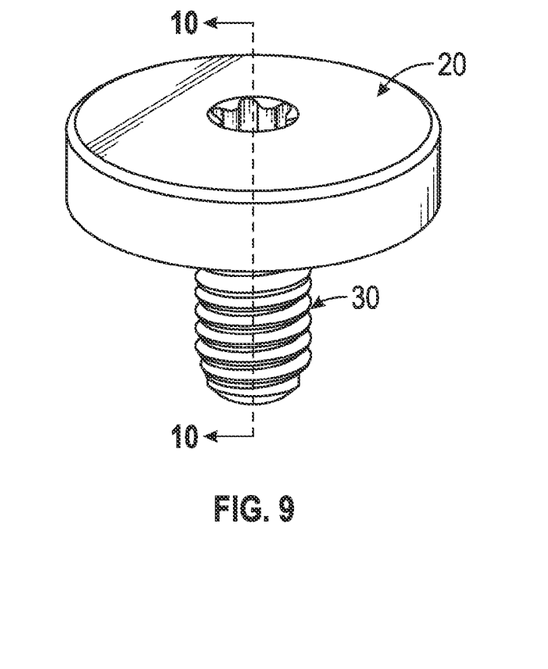
FIG. 9 is a side perspective view of a third embodiment of the present invention.
Figure 10:
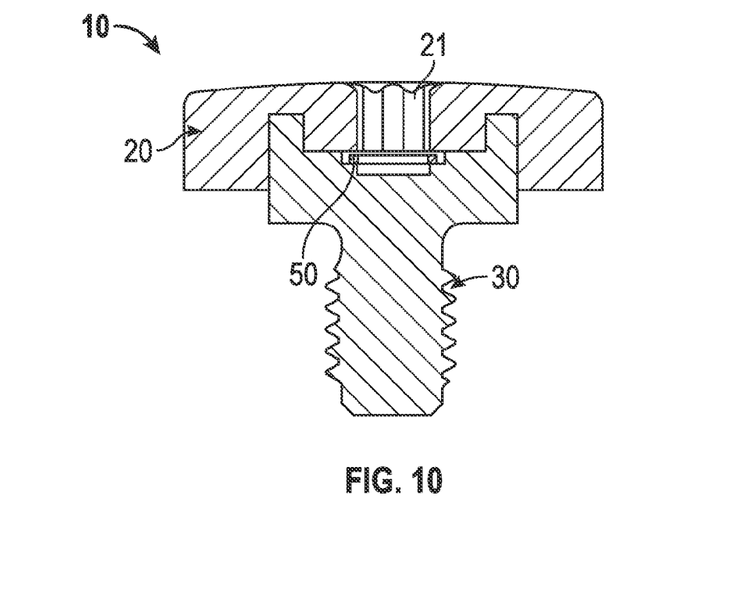
FIG. 10 is a cross-sectional view of the embodiment shown in FIG. 9 along lines 10-10.
Figure 11:
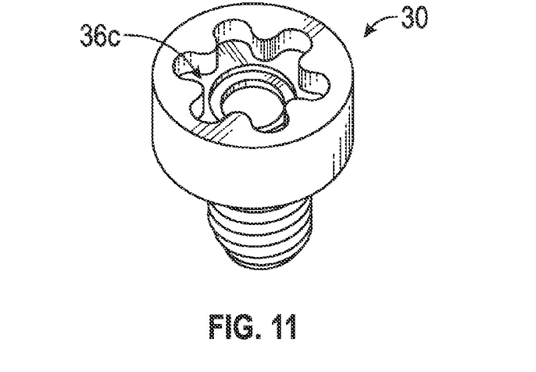
FIG. 11 is a top perspective view of the threaded part of the third embodiment without a retaining ring.
Figure 12:
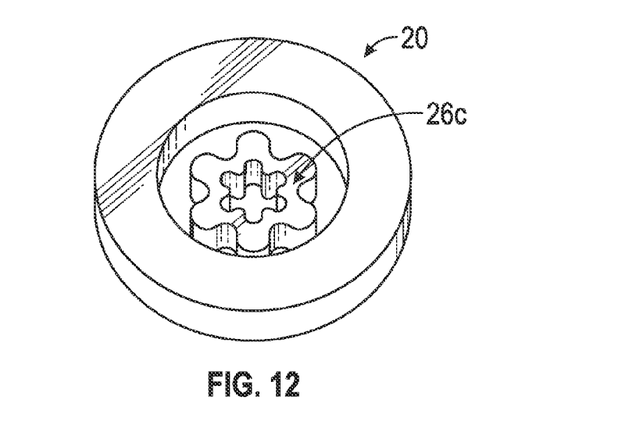
FIG. 12 is a bottom perspective view of the drive part of the third embodiment.
Figure 13:
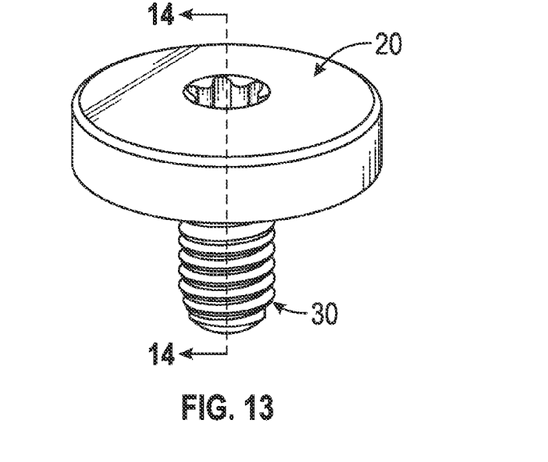
FIG. 13 is a side perspective view of a fourth embodiment of the present invention.
Figure 14:
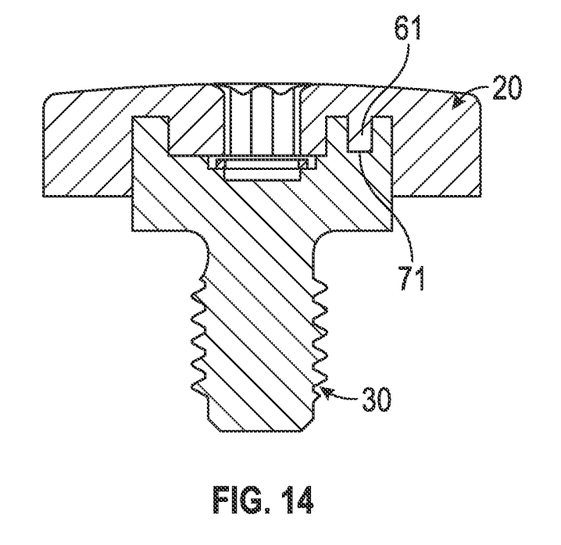
FIG. 14 is a cross-sectional view of the embodiment shown in FIG. 13 along lines 14-14.
Figure 15:
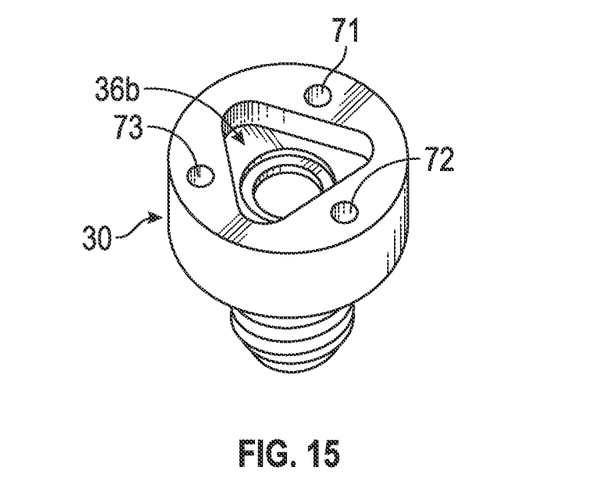
FIG. 15 is a top perspective view of the threaded part of the fourth embodiment without a retaining ring.
Figure 16:
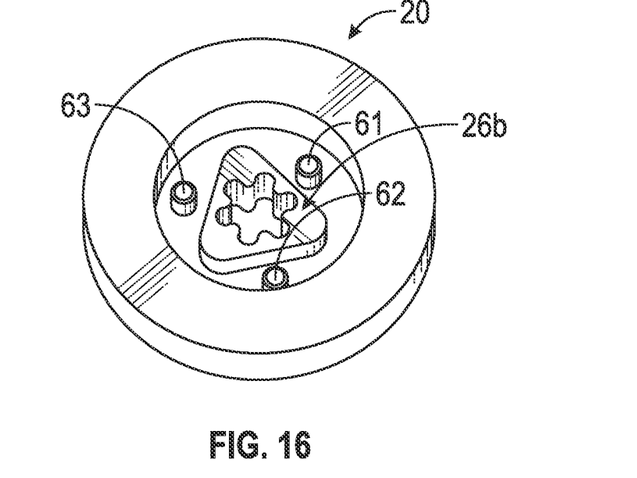
FIG. 16 is a bottom perspective view of the drive part of the fourth embodiment.
Figure 17:
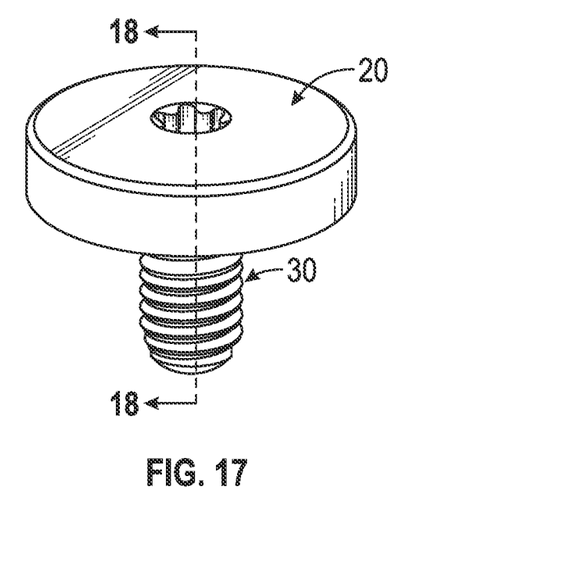
FIG. 17 is a side perspective view of a fifth embodiment of the present invention.
Figure 18:
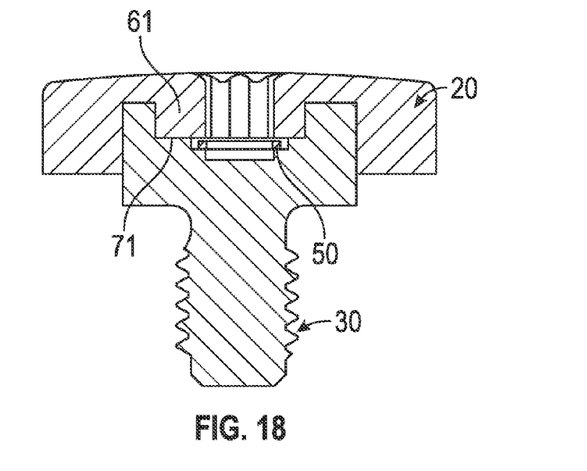
FIG. 18 is a cross-sectional view of the embodiment shown in FIG. 17 along lines 18-18.
Figure 19:
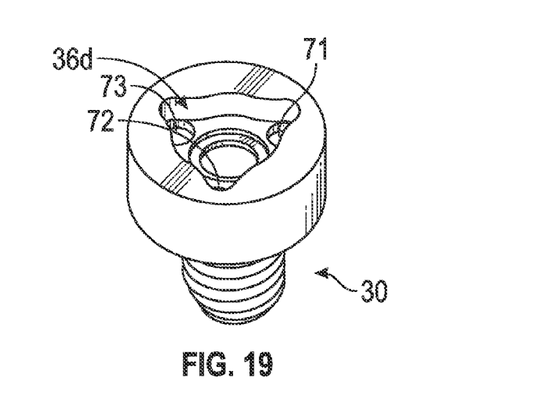
FIG. 19 is a top perspective view of the threaded part of the fifth embodiment without a retaining ring.
Figure 20:
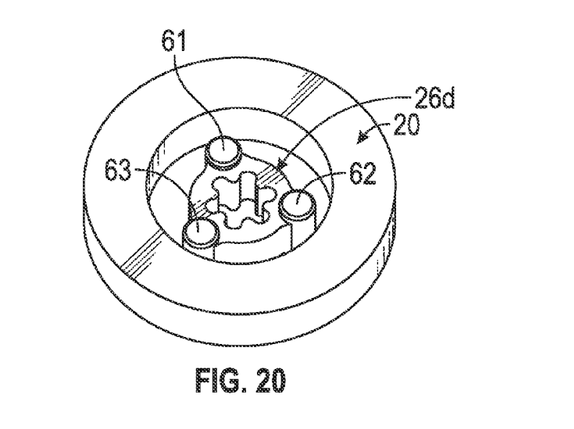
FIG. 20 is a bottom perspective view of the drive part of the fifth embodiment.
Figure 21:
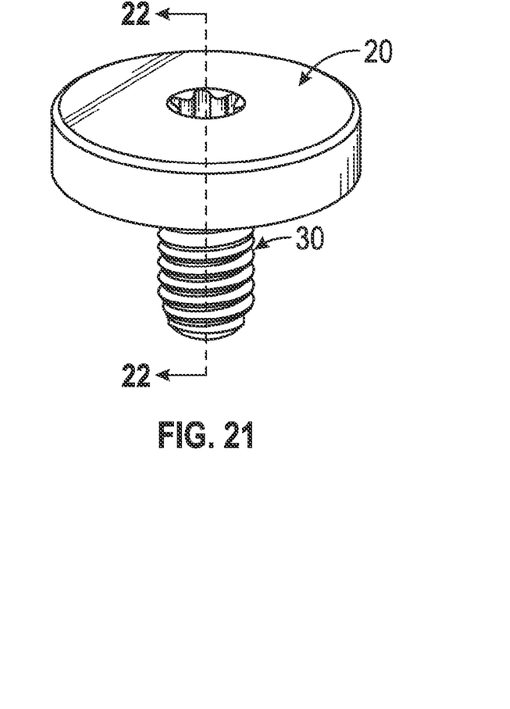
FIG. 21 is a side perspective view of a sixth embodiment of the present invention.
Figure 22:
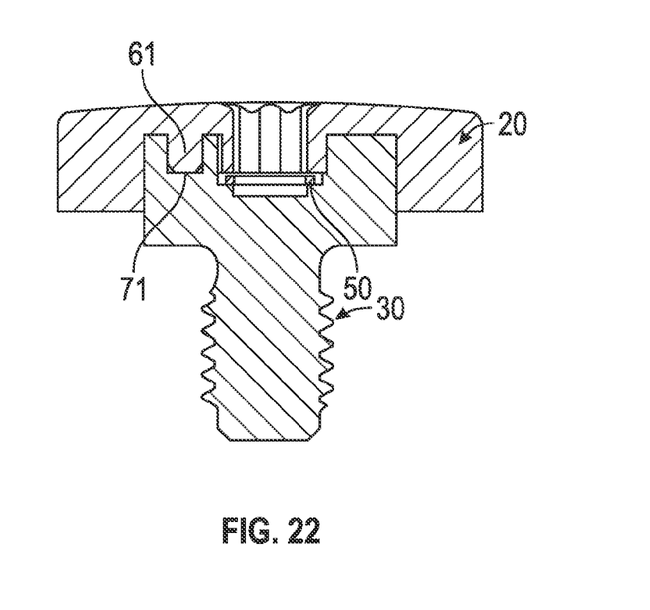
FIG. 22 is a cross-sectional view of the embodiment shown in FIG. 21 along lines 22-22.
Figure 23:
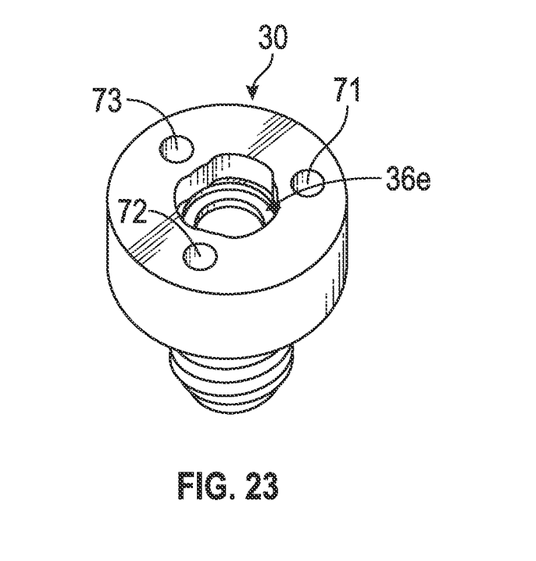
FIG. 23 is a top perspective view of the threaded part of the sixth embodiment without a retaining ring.
Figure 24:
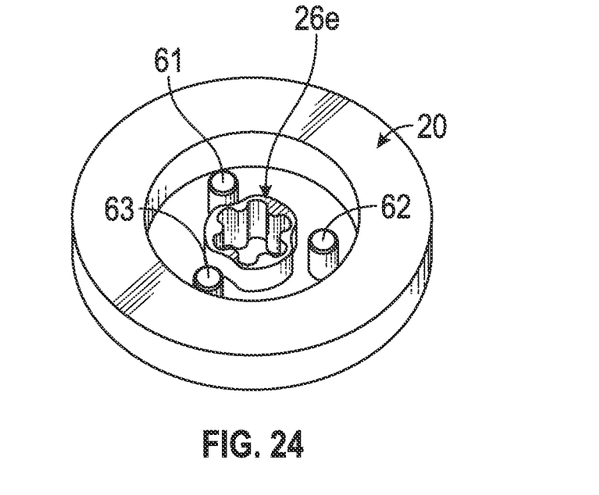
FIG. 24 is a bottom perspective view of the drive part of the sixth embodiment.

The retaining ring 50, shown in FIGS. 2 and 4A, preferably has a shape similar to the letter C, with an inner opening 52 and a side opening 54, and is composed of a metal material, but may in alternative embodiments be composed of an elastomeric material. The retaining ring 50 preferably has a diameter that is smaller than the diameter of the cavity 40. When a torque wrench (not shown) is applied to the screw 10 of the present invention, the tip of the wrench extends through the inner opening 52 of the retaining ring 50, pushing the two ends 56, 58 apart and causing the ring's 50 radius to expand in a horizontal direction, press against the wall 42 of the cavity 40, and press against and grip the tip of the wrench. In this way, the retaining ring 50 causes the screw 10 to become removably affixed to the wrench during removal, and reduces the likelihood that the screw 10 will be lost during adjustment. It is important that the retaining ring 50 be composed of material with sufficient elasticity and structural integrity to ensure expansion and avoid breakage while allowing the retaining ring 50 to return to its original, unexpanded configuration, such as steel or other metal alloys.

The interface surfaces 25, 35 are shaped to transmit torque from the drive part 20 to the threaded part 30. As shown in the Figures, interface surfaced 25, 35 the screw 10 of the present invention may form structures having various shapes or geometries. For example, in the preferred embodiment, the interface surfaces 25, 35 of the drive and threaded parts 20, 30 include a circular configuration 26a, 36a. In the embodiment shown in FIGS. 5-8, the interface surfaces 25, 35 of the drive and threaded parts 20, 30 include a triangular configuration 26b, 36b. In the embodiment shown in FIGS. 9-12, the interface surfaces 25, 35 of the drive and threaded parts 20, 30 include a hexalobular configuration 26c, 36c.

In other embodiments, the drive and threaded parts 20, 30 of the screw may include additional features to ensure that the parts 20, 30 do not disengage from each other during use. For example, the embodiments shown in FIGS. 13 through 24 include projections or pins 61, 62, 63 extending from the receiving cavity 22 of the drive part 20 that mate with holes 71, 72, 73 extending into the projecting portion 32 of the threaded part 30. In the embodiment shown in FIGS. 13-16, the interface surfaces 25, 35 of the drive and threaded parts 20, 30 include a triangular configuration 26b, 36b and the pins 61, 62, 63 and holes 71, 72, 73 described herein. In the embodiment shown in FIGS. 17-20, the interface surfaces 25, 35 of the drive and threaded parts 20, 30 include a different triangular configuration 26d, 36d that incorporates the pins 61, 62, 63 and holes 71, 72, 73 into its structure. In the embodiment shown in FIGS. 21-24, the interface surfaces 25, 35 of the drive and threaded parts 20, 30 include a rounded triangular configuration 26e, 36e and the pins 61, 62, 63 and holes 71, 72, 73 described herein.

Screws 10 with low torque requirements can use simple press fit diameters, such as those included in the embodiments shown in FIGS. 1A through 12, to transmit the torque, and rely on the friction between the interface surfaces 25, 35 to resist torque applied to the drive part 20. For higher torque requirements, the interface surfaces 25, 35 need to be connected by more than just friction. The embodiments shown in FIGS. 13 through 24 transmit higher torque forces due to the inclusion of pins 61, 62, 63 and holes 71, 72, 73, so are more suitable for higher torque requirements.

The embodiments shown in FIGS. 1-24 are not intended to be limiting, however, because the screw 10 of the present invention may incorporate a structure of any shape, including those disclosed herein, in its interface surfaces 25, 35 to increase friction and transmit torque, and may also combine any of the shapes disclosed herein or known to a person skilled in the art with the pins 61, 62, 63 and holes 71, 72, 73 described herein. In one alternative embodiment, for example, the pins 61, 62, 63 may be disposed on the projecting portion 32 white the holes 71, 72, 73 may be disposed within the receiving cavity 22. The embodiments disclosed herein may also be composed of any number of materials known to a person skilled in the art, and the drive part 20 of the screws 10 disclosed herein a have through-bores with any number of shapes other than hexalobular.

Each of the parts of the embodiments disclosed herein may be composed of any material known to a person skilled in the art, including metal alloys such as tungsten alloy, aluminum alloy, steel, titanium alloy, and magnesium alloy, polymeric materials such as plastic and rubber, and composite materials, and may be made by any process known in the art, including, but not limited to, metal injection molding, powder metallurgy, and thixomolding. The materials used to form the screws 10 disclosed herein can be selected based on the type of weighting required. For example, if a golf club head requires a heavy weight, one or more parts of the screw 10 can be composed of a high density material such as tungsten, whereas a golf club head requiring a lightweight weight could incorporate a screw 10 with one or more parts composed of composite, plastic, aluminum alloy, or magnesium alloy. The material of the drive part 20 can be adjusted, while maintaining, a consistent volume of the drive part 20, to adjust the overall weight of the screw 10 of the present invention, and separating the drive part 20 from the threaded part 30 allows for cost savings if only the drive part 20 material needs to change to provide multiple weighting options.

In one particular embodiment, each of the drive part 20, threaded part 30, and retaining ring 50 is formed from stainless steel. Weight screws 10 having this material composition and a length of approximately 0.600 inch were hit tested by engaging the screws 10 with weight ports in a golf club head and then hitting golf balls with the golf club head 10,000 times at a speed of 110 mph at various points on the golf club face. The screws 10 did not crack and their length did not change at any point during this test.

In another particular embodiment, the drive part is 20 is formed from a thixomolded magnesium alloy, while the threaded part 30 is formed from a different, metal alloy.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

The invention claimed is:

1. A screw comprising:
a drive part comprising a receiving cavity;
a threaded part comprising a projecting portion and a pocket; and
a retaining ring
wherein the drive part is formed separately from the threaded part,
wherein the retaining ring is disposed in the pocket,
wherein the projecting portion is sized to mate with the receiving cavity,
wherein the receiving cavity comprises a first plurality of interface surfaces,
wherein the projecting portion comprises a second plurality of interface surfaces, and
wherein friction between the first and second pluralities of interface surfaces fixes the drive part to the threaded part.

2. The screw of claim 1, wherein the retaining ring is composed of a material selected from the group consisting of elastomer, metal, and composite.

3. The screw of claim 2, wherein the retaining ring is composed of a metal material.

4. The screw of claim 3, wherein the retaining ring is composed of steel.

5. The screw of claim 1, wherein the receiving cavity comprises a shape.

6. The screw of claim 5, wherein the shape is selected from the group consisting of circular, triangular, square, rectangular, oval, and hexalobular.

7. The screw of claim 1, wherein the receiving cavity comprises a plurality of pins, wherein the projecting portion comprises a plurality of holes, and wherein the plurality of pins mates with the plurality of holes.

8. The screw of claim 1, wherein the receiving cavity comprises a plurality of holes, wherein the projecting portion comprises a plurality of pins, and wherein the plurality of pins mates with the plurality of holes.

9. The screw of claim 1, wherein the pocket has a first diameter, wherein the retaining ring has a second diameter, and wherein the second diameter is smaller than the first diameter.

10. The screw of claim 1, wherein the pocket is sized to permit the retaining ring to expand in a horizontal direction and not a vertical direction.

11. The screw of claim 1, wherein the drive part comprises a through bore with a hexalobular geometry.

12. The screw of claim 1, wherein torque applied to the drive part is transmitted to the threaded part via the receiving cavity and the projecting portion.

13. The screw of claim 1, wherein the drive part is composed of a first material, wherein the threaded part is composed of a second material, and wherein the first material is different from the second material.

14. The screw of claim 1, wherein the drive part is composed of a material having a density of no less than 1 g/cc to and no more than 16 g/cc.

15. The screw of claim 1, wherein the threaded part is composed of a material having a density of no less than 2.5 g/cc and no more than 12 g/cc.

16. The screw of claim 1, wherein the drive part is composed of thixomolded magnesium material, and wherein the threaded part is composed of a different metal.

17. A weight screw comprising:
a drive part composed of a material having a density of no less than 1 g/cc and no more than 16 g/cc;
a threaded part formed separately from the threaded part composed of a material having a density of no less than 2.5 g/cc and no more than 12 g/cc;
a receiving cavity comprising a first plurality of interface surfaces;
a projecting portion comprising a second plurality of interface surfaces;
a pocket; and
a retaining ring composed of a metal alloy,
wherein the retaining ring is disposed in the pocket,
wherein the pocket is sized to permit the retaining ring to expand in a horizontal direction and not a vertical direction,
wherein the projecting portion is sized to mate with the receiving cavity, and
wherein friction between the first and second pluralities of interface surfaces fixes the drive part to the threaded part.

18. The weight screw of claim 17, wherein the receiving cavity is disposed on the drive part, wherein the projecting portion and the pocket are disposed on the threaded part, and wherein the receiving cavity has a hexalobular shape.

19. The weight screw of claim 17, further comprising a plurality of holes and a plurality of pins, and wherein the plurality of pins mates with the plurality of holes.

20. The weight screw of claim 19, wherein the plurality of holes is disposed on the receiving cavity, and wherein the plurality of pins is disposed on the projecting portion.

* * * * *